2,699,604

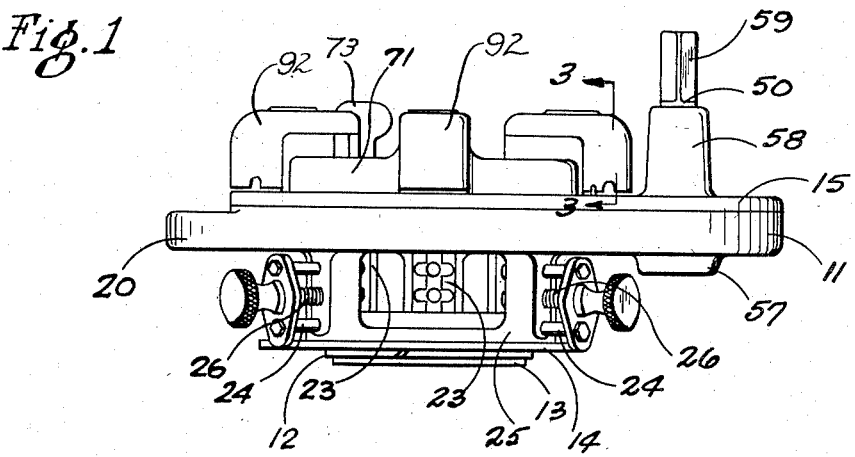
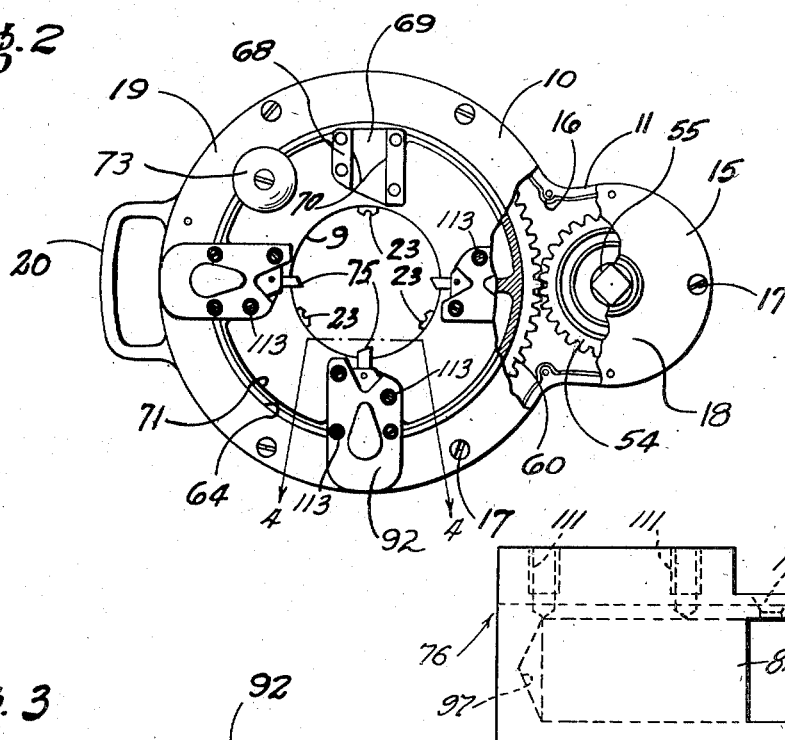
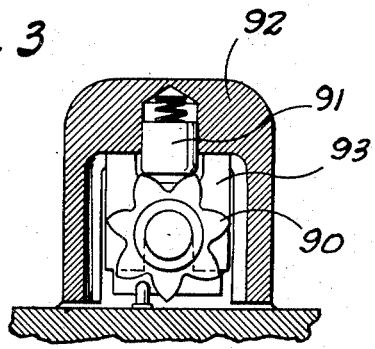
INVENTORS
CARL H. INGWER
CLYDE E. WRIGHT
By J. N. Douglas
THEIR ATTORNEY Jan. 18, 1955
C. H. INGWER ET AL
2,699,604
PIPE CUTTER TOOLHOLDER
Filed Jan. 27, 1950
2 Sheets-Sheet 2
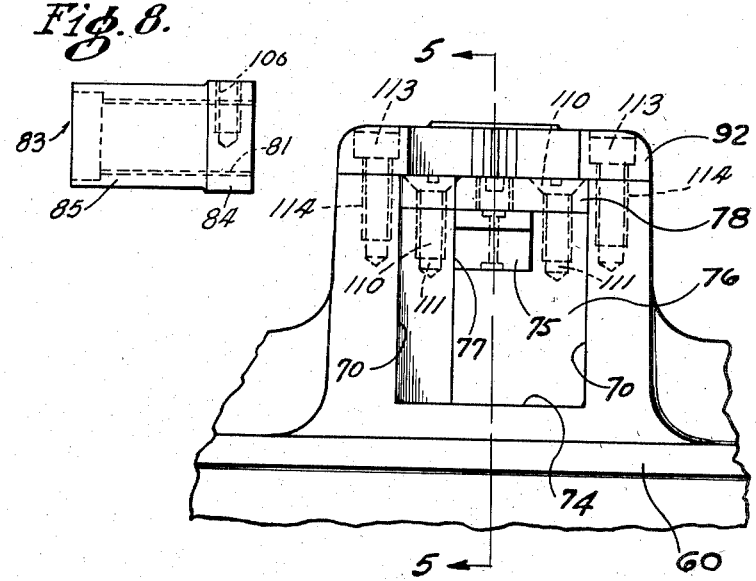
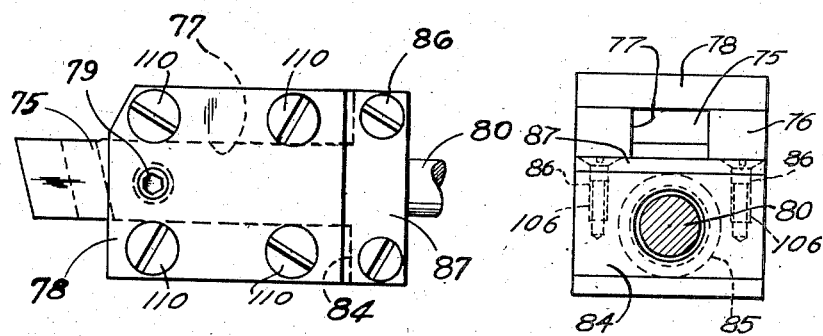
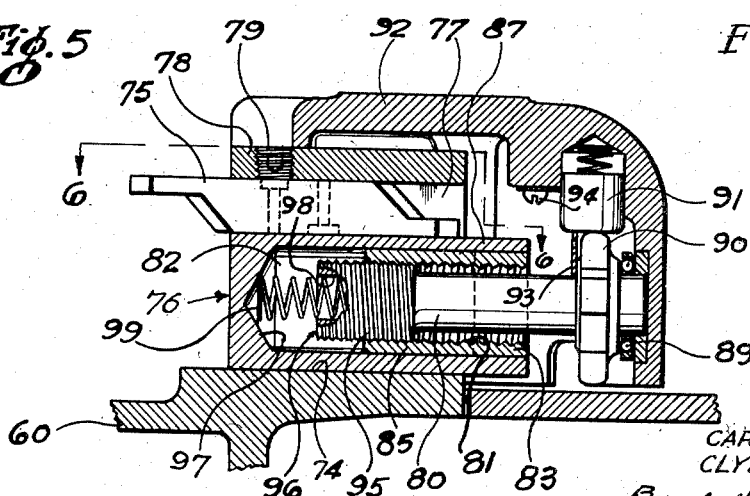
INVENTORS
CARL H. INGWER
CLYDE E. WRIGHT
By J. D. Douglas
THEIR ATTORNEY ; # United States Patent Office 2,699,604
Patented Jan. 18, 1955

PIPE CUTTER TOOLHOLDER

Carl H. Ingwer and Clyde E. Wright, Elyria, Ohio, assignors to The Ridge Tool Company, Elyria, Ohio Application January 27, 1950, Serial No. 140,854

3 Claims. (Cl. 30—97)

This invention pertains to pipe cutters, and more particularly to an improved cutter carrier for an automatic feed on a pipe cutter.

The copending application of Carl H. Ingwer and Clyde E. Wright, filed February 24, 1949, Ser. No. 78,033, disclosed a novel pipe cutting machine. This device carried a series of cutting tools about the pipe and fed them in automatically as the device was turned to cut the pipe.

Our invention is directed at an improvement over the foregoing structure which consists of a tool holding block and lead screw combination which has a much smaller frictional surface and, at the same time, makes an even adjustment of the cutters a certainty. In addition, with our new device, it is impossible to jam the tool holder blocks on the feed screw in a fully retracted position.

Other advantages of our invention, and the invention itself, will become more apparent from reference to the following figures and the description which forms a part of this specification.

In the drawings:

Fig. 1 is a side elevational view of a pipe cutter embodying our invention;

Fig. 2 is a top plan view thereof with a part of the cover broken away to show the drive gears;

Fig. 3 is a sectional view along line 3—3 of Fig. 1;

Fig. 4 is an enlarged end view of our device from line 4—4 of Fig. 2 showing a portion of the body of the cutter machine;

Fig. 5 is a sectional view taken along line 5—5 of Fig. 4;

Fig. 6 is a view along line 6—6 of Fig. 5;

Fig. 7 is an end view of the parts shown in Fig. 6;

Fig. 8 is a side elevational view of the separate nut piece removed from the tool holder; and Fig. 9 is a side elevational view of the tool holder block of Fig. 6 with all the associated parts removed.

Briefly, our invention comprises a new tool holder block having a threaded hole extending into it for a portion of its length, and a chamber larger than the outer diameter of its threads formed in the interior of the block extending from the hole. The feed screw is also new, having threads for only a portion of its length so that when the screw is completely screwed into the block, the threads on the screw run out of the threads on the block and turn freely in the chamber. A spring engaged between the block and the feed screw urges them into engagement so that when the direction of turning the screw is reversed, the threads will again become engaged and the cutters will be forced outwardly.

More specifically, our device is adapted peculiarly for use in a pipe cutter such as is the subject of the aforementioned co-pending application of Carl H. Ingwer and Clyde E. Wright. In that application is disclosed a pipe cutter having a series of cutter carriers disposed about a gear which was carried around a pipe to cut it.

More specifically, and referring to the drawings, the device is primarily enclosed in a housing 10 which comprises two separate pieces, a gear case 11 which also includes the mounting 12 for the clamping device and a supporting boss 13 for the gage ring 14 of the clamping device hereinafter described and a gear case cover 15. The shape of the gear case is generally that of two intersecting circles of unequal diameter with a large central opening 9 in the larger circle through which the pipe may protrude.

On the interior of the gear case along the periphery a series of bosses 16 are provided, each of which is drilled and tapped to receive screws 17 which hold the cover 15 in place on the gear case 11. Opposite the smaller circular portion 18 and attached to the larger circular portion 19, I have provided a handle 20 to facilitate the handling and placing of my device.

On the underside of the gear case, I have provided a clamping device similar to that described in Patent No. 1,973,231 issued to W. O. Thewes on September 11, 1934, except that the clamping jaws are much longer, as described in the aforesaid application of Ingwer and Wright. Briefly, the device comprises three jaws 23 supported by pins 24 slidably journalled in three legs 25. These jaws are clamped about the pipe by screws 26 threaded into the legs 25 and forcing the pins 24 to clamp the jaws onto the pipe.

The driving pinion 54 is enclosed in the small portion 18 of the housing and is keyed to its shaft 55. One end of the shaft 55 is journalled in a boss 57 on the under side of the small portion of the housing. The shaft is also journalled over a greater part of its length in a large boss 58 in a similar position on the cover 15. The other end 59 of the shaft which extends beyond the cover is formed in the shape of a square to receive the joint from a portable power unit or handle not shown.

The driven gear 60 is journalled in the housing leaving an opening through the center through which a pipe may extend, and about which it may be driven by the pinion 54. On its upper surface, the gear 60 carries a series of cutter carriers 68, each consisting of a large trapezoidal boss having a channel 69 through it, whose side walls 70 are parallel to a radius of the gear circle drawn through the center of the channel. In the embodiment shown, there are four of these carriers, but it is conceived that there might be two or six, so long as an even number of carriers is provided. The trapezoidal shape is used to reduce the weight and amount of material used in the gear and still provide sufficient strength to drive the cutters properly. In addition, such shape allows more clearance around the leading edge of the cutter for metal chips to curl into. A web 71 around the circumference of the upper portion of the gear is provided to stiffen the cutter carriers additionally and to provide a shield for the bearing surfaces at 65 to prevent metal chips from coming between the bearing surfaces and jamming the device. At a point on this web, preferably midway between any two of the cutter carriers, a boss is formed on which is disposed a knob 73. This knob is rotatably journalled thereon and thus provides a hand hold with which it is possible to rotate the gear freely in order to adjust the position of the cutting surfaces as hereafter described.

A single carrier is shown in Fig. 4. As stated above, the carrier is channel shaped, being formed with two walls 70 and a base 74 which may be slightly raised from the surface of the main gear 60. The walls of this carrier are somewhat higher than were the corresponding walls of the devices disclosed in the aforesaid copending application for a purpose soon to be apparent.

The tool holder is slidably disposed in the channel formed by these walls 70 and the base 74 as in the previous device but is formed somewhat differently. Whereas, in the previous device, the tool bit 75 was carried almost coaxially with the feed screw, we prefer to form our new holder from a block 76 with a channel 77 in which the bit is disposed and covered by a cover 78 carrying a set screw 79 adapted to be clamped down on the bit 75 to hold it in place. The cover is held in place by screws 110 which extend through the cover into threaded engagement with holes 111.

The axis of the feed screw 80 is considerably below the tool bit 75, and the thread arrangement is somewhat different from the previous device. As is best shown in Fig. 5, the threads 81 in the block 76 extend into the block for only a portion of the length thereof. A chamber 82 is formed in the blocks 76 beyond the threads 81 and has a larger diameter than the threads. It is apparent that this formation could be readily made in a single block. However, for ease in manufacturing the device, we prefer merely to drill a hole in the block 76 to form the chamber 82. This hole is of considerably larger diameter than the threads 81. The threads 81 are formed on a separate nut piece 83 having a square or rectangular end 84 and a round portion 85 of the diameter of the chamber 82. This may be inserted into the hole which forms the chamber 82 and is held therein by screws 86 extending through countersunk holes 105 placed in a portion 87 of the block 76 which overlaps the rectangular end 84, and then extending into threaded engagement with holes 106 in block 83. This overlapping portion 87 on the block 76 prevents the nut 83 from turning in the block and is therefore desirable, although it will readily be seen that it is not absolutely necessary.

The feed screw 80 is journalled in a ball thrust bearing 89 and carries a start wheel 90 engaged by a spring loaded detent 91 slidably disposed in the housing cover 92. The screw 80 is held against longitudinal displacement away from the bearing 89 by a keeper 93 fixed to the cover 92 by screws 94. The screw 80 is formed with a threaded portion 95 just long enough so that when the screw 80 is fully threaded into the block 76, the threaded portion 95 is disengaged from the nut 83 without the end 96 of the screw touching the end wall 97 of the chamber 82. A hole 98 is formed in the end of the screw 80 and a compression spring 99 is disposed therein and in contact with the end wall 97 of the chamber to urge the nut 83 continuously into contact with the screw 80 so that if the direction of rotation of the screw is proper, the threads will engage each other to force the tool holder outward of the cutter carrier so that the cutter bits will engage the pipe to cut it, as described in the co-pending application previously referred to.

The cover 92 encloses the driving mechanism and covers the top of the channel to keep the tool holder therein and additionally to make a neat appearing device. The cover is secured to the channel by means of screws 113 which extend through the cover into threaded holes 114 placed in the channel. This cover also provides a seat for the bearing 89 and is similar in purpose and shape to that disclosed in the aforesaid co-pending application.

Thus, it will be seen that when the device is being assembled all the tool holders may be adjusted equally distant from the center line of the cutter machine simply by fully retracting all of them so that all the feed screws 80 are free of the threads in the nut pieces 83 and then rotating the machine in the opposite direction so that all the threads will become engaged at approximately the same time. The largest error possible with this type of adjustment would be the pitch of a single thread, and this is both unlikely, and, at the same time, the difference will be almost negligible.

In addition, it is apparent that by this invention, the screws are prevented from jamming in a fully opened position, and the cutter may be turned indefinitely to retract the cutters without doing any damage. This may be particularly important where the machine is driven by a power drive as it was intended to be. A further advantage is gained by having fewer threads in contact at the retracted position, thus decreasing the area in frictional contact.

Having thus described our invention, we are aware that numerous changes and departures may be made therefrom without departing from the spirit or scope of our invention.

We claim:
1. A tool holder for a pipe machine comprising a block slidably disposed on said machine, a cutting tool fixed in said block, said block formed with an opening thereinto from one end, said opening formed as a channel transversely across said block at its open end and extending from said channel as a hole in said block, a T-shaped member formed with internal threads extending into said opening but spaced from the closed end thereof, the cross part of said T-shape extending in said channel, said member being thus fixed in said block and a lead screw threaded into said member to extend and retract said tool, said screw having a threaded part arranged to run out of said internal threads into said opening when said block is fully retracted.

2. A tool holder, and a guide therefor, said tool holder provided with a bore opening through one end, said bore provided with lead screw threads extending from the end into the bore and terminating spaced from the inner end of the bore, the inner end of the bore provided with an enlarged chamber, a rotatable lead screw for engagement in said lead screw thread and including a stem supported on one end and being of reduced diameter, and an enlarged threaded portion provided on the free end of the lead screw, said threaded portion being shorter than the enlarged chamber, and said lead screw upon being rotated adapted to have the threaded end pass beyond the threads in the holder and to rotate freely in said chamber.

3. A tool holder, and a guide therefor, said tool holder provided with a bore opening through one end, said bore provided with lead screw threads extending from the end into the bore and terminating spaced from the inner end of the bore, the inner end of the bore provided with an enlarged chamber, a rotatable lead screw for engagement in said lead screw thread and including an elongated stem supported on one end and being of reduced diameter, and an enlarged threaded portion provided on the free end of the lead screw, said threaded portion being shorter than the enlarged chamber and said elongated end being long enough to allow the threaded end to extend into the enlarged chamber free of the lead screw threads in said bore, and said lead screw upon being rotated adapted to have the threaded end pass beyond the threads in the holder and to rotate freely in said chamber, spring means interposed between the end of the lead screw and the end of the chamber to resiliently urge the holder and the lead screw in opposite directions.

References Cited in the file of this patent

UNITED STATES PATENTS

| Number | Name | Date |
|---|---|---|
| 1,008,393 | Toegel | Nov. 14, 1911 |
| 1,115,277 | Bodkins | Oct. 27, 1914 |
| 1,511,445 | Clarkson | Oct. 14, 1924 |
| 1,609,772 | Rank | Dec. 7, 1926 |
| 2,010,853 | Dyer | Aug. 13, 1935 |

FOREIGN PATENTS

| Number | Country | Date |
|---|---|---|
| 440,292 | Great Britain | Dec. 24, 1935 |
| 587,093 | France | July 27, 1897 |